United States Patent
McCoy et al.

(10) Patent No.: US 7,258,508 B2
(45) Date of Patent: Aug. 21, 2007

(54) ANNULAR SAFETY AND FLOW CONTROL SYSTEM FOR UNDERGROUND GAS STORAGE

(75) Inventors: Allan R. McCoy, League City, TX (US); Darrell Melear, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 170 days.

(21) Appl. No.: 11/075,012

(22) Filed: Mar. 8, 2005

(65) Prior Publication Data

US 2006/0204337 A1 Sep. 14, 2006

(51) Int. Cl.
*E21B 34/06* (2006.01)
*B65G 5/00* (2006.01)
(52) U.S. Cl. .......................... 405/53; 405/59; 166/373
(58) Field of Classification Search ................ 405/52, 405/53, 59; 166/372–374
See application file for complete search history.

(56) References Cited

U.S. PATENT DOCUMENTS

| | | | | |
|---|---|---|---|---|
| 2,787,455 A * | 4/1957 | Knappen | ........................ | 299/5 |
| 2,922,281 A * | 1/1960 | Brooks | ........................ | 405/59 |
| 3,897,822 A * | 8/1975 | Mott | ........................ | 166/72 |
| 4,249,833 A * | 2/1981 | Talley | ........................ | 405/58 |
| 4,589,482 A * | 5/1986 | Bayh, III | ................. | 166/105.5 |
| 4,632,184 A * | 12/1986 | Renfroe et al. | ........... | 166/105.5 |
| 4,676,307 A * | 6/1987 | Pringle | ........................ | 166/322 |
| 4,749,043 A * | 6/1988 | Rodenberger | ................ | 166/321 |
| 4,842,074 A | 6/1989 | Hines et al. | .............. | 166/305.1 |
| 5,141,057 A | 8/1992 | Chaix | ......................... | 166/373 |
| 5,172,717 A * | 12/1992 | Boyle et al. | ................. | 137/155 |
| 5,305,828 A * | 4/1994 | White et al. | ................. | 166/120 |
| 5,318,127 A | 6/1994 | Hines et al. | ................. | 166/321 |
| 5,394,943 A | 3/1995 | Harrington | ................... | 166/373 |
| 5,505,263 A | 4/1996 | White et al. | ................. | 166/374 |
| 5,700,376 A * | 12/1997 | Carpenter | ................... | 210/695 |
| 5,947,206 A * | 9/1999 | McCalvin et al. | ........... | 166/324 |
| 6,148,915 A * | 11/2000 | Mullen et al. | ............... | 166/278 |
| 6,173,788 B1 * | 1/2001 | Lembcke et al. | ........... | 166/387 |
| 6,840,317 B2 * | 1/2005 | Hirsch et al. | ........... | 166/250.15 |
| 7,114,561 B2 * | 10/2006 | Vinegar et al. | ........ | 166/250.01 |

* cited by examiner

*Primary Examiner*—Tara L. Mayo
(74) *Attorney, Agent, or Firm*—Shawn Hunter

(57) ABSTRACT

A gas storage well with a tubing string that is disposed within a wellbore communicating an underground storage cavern with the surface. A surface controlled subsurface safety and flow control system is provided within the wellbore so that all flow into or out of the well can be shut down rapidly in the event of an emergency. The safety and flow control system features a dual opening-style packer element that provides an annulus seal between the surrounding casing and the tubing string and between the casing and a pup joint that is located within the annulus. Both the tubing string and the pup joint contain surface controlled subsurface safety valves that are capable of quickly shutting off flow through both the flowbore and the annulus. Each valve can be opened or closed independently of the other.

19 Claims, 4 Drawing Sheets

ANNULAR SAFETY AND FLOW CONTROL SYSTEM FOR UNDERGROUND GAS STORAGE

BACKGROUND OF THE INVENTION

1. Field of the Invention

The invention relates generally to well safety systems and flow control systems for underground gas storage wells and reservoirs and the like. In particular aspects, the invention relates to well safety systems having a plurality of surface controlled subsurface safety valves.

2. Description of the Related Art

Storage wells are used to provide temporary underground storage for excess natural gas that has been produced. Storage wells are often located in underground salt domes, thereby providing a large underground storage cavern. In this instance, it is necessary to drill a wellbore that communicates with the surface. Gas is injected into the storage well and then removed at a later time when needed. To accomplish the injection of gas, a tubing string is typically disposed into the wellbore, suspended from a wellhead. Gas is injected down the annulus between the tubing string and the wellbore wall. Because water is typically present in the gas storage well, it must be removed to accommodate the injected gas. Valving within the wellhead tree controls the flow of gas and water into and out of the cavern, respectively.

An important design feature for a gas storage well is the ability to provide high fluid flow rates. In modern storage wells, high flow rates are needed during injection of gas as well as production of gas from the well. Some systems, for example, are required to provide production rates of 200 million to 300 million cubic feet per day of gas. Conventional flow control systems are generally unable to provide the high flow rates that are necessary.

A second important design feature for a gas storage well is the ability to close off the well below the surface quickly in the event of an emergency. Wellhead tree valves are not useful in the event of an emergency requiring that gas flow be shut off at a point well below the surface of the well. If there is no subsurface safety valve present, the well cannot be safely shut off in the event of an emergency. Inflatable packers are sometimes used as temporary barriers to close off portions of the well below the surface. However, even these are not useful in an emergency where rapid shut down is required. These barriers require downhole control in that tools must be run in to the wellbore to actuate them.

Some systems are known that have employed surface controlled subsurface valves to control flow into and/or out of a gas storage well. In general, however, these are complex tools of highly specialized construction and, as a result, quite costly. Additionally, these arrangements are generally unable to perform simultaneous injection of gas and leaching of water. Water flow out of the storage cavern is conducted through a portion of the flowbore of the tubing string and then laterally outwardly into the annulus. Therefore, injection of gas must be stopped to allow water to be leached. This is undesirable.

The present invention addresses the problems of the prior art.

SUMMARY OF THE INVENTION

The invention provides a control system for a gas storage well that affords total annular control of flow into and out of the storage well. In addition, the control system is inexpensive and readily constructed from standard, off-the-shelf components and without the need for expensive specialized tools. In a preferred embodiment described herein, a gas storage well is provided with a tubing string that is disposed within a wellbore communicating an underground storage cavern with the surface. Suitable piping and valves are provided at the wellhead to provide gas flow into the cavern via the annulus surrounding the tubing string and simultaneous water flow out of the cavern via the flowbore of the tubing string. In addition, gas can be flowed out of the cavern through both the annulus and the flowbore.

A surface controlled subsurface safety and flow control system is provided within the wellbore so that all flow into or out of the well can be shut down rapidly in the event of an emergency. In a preferred embodiment, the safety and flow control system is provided by a dual opening-style packer element that provides an annulus seal between the surrounding casing and the tubing string and between the casing and a pup joint that is located within the annulus. Both the tubing string and the pup joint contain surface controlled subsurface safety valves that are capable of quickly shutting off flow through both the flowbore and the annulus. Each valve can be opened or closed independently of the other. The safety and flow control system allows use of essentially the entire annulus as well as the flowbore of the tubing string for production of gas from the well. This type of system allows significantly higher rates of production than with prior systems.

DETAILED DESCRIPTION OF THE PREFERRED EMBODIMENTS

Figure 1:
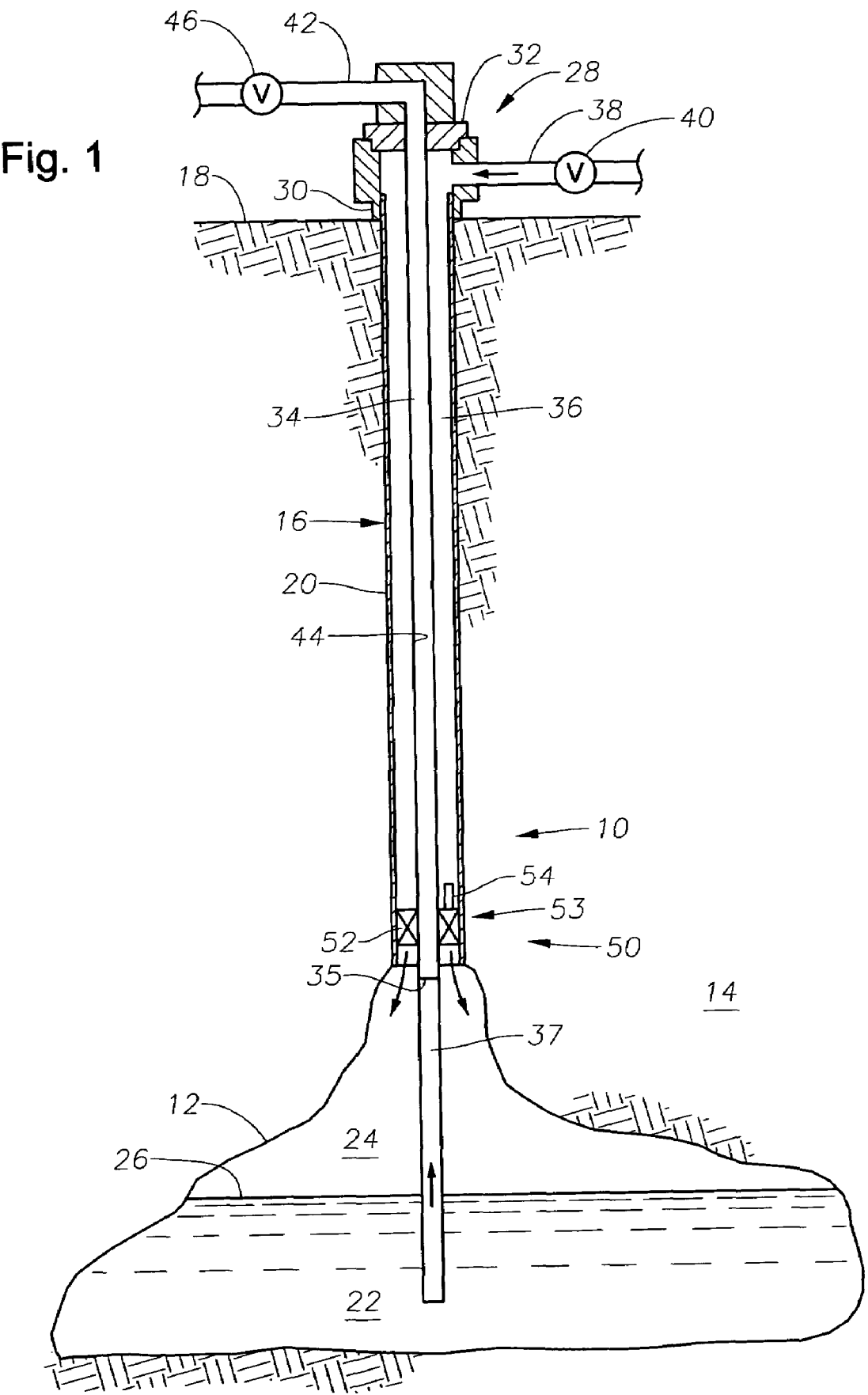
FIG. 1 depicts an exemplary underground gas storage well that incorporates the safety and flow control system of the present invention.

FIG. 1 illustrates an exemplary underground hydrocarbon gas storage well 10 that includes an underground cavern 12 that is typically a salt dome within the earth 14. Those of skill in the art will understand that the cavern 12 may also be provided by a depleted hydrocarbon reservoir. A wellbore 16 has been drilled through the earth 14 from the surface 18 down to the cavern 12. At least a portion of the wellbore 16 is typically lined with steel casing 20, in a manner known in the art. FIG. 1 depicts the well 10 at the outset of a gas storage operation, and therefore, the cavern 12 includes a volume of water 22 and a volume of gas 24 just above, the two being delineated by a gas/water interface 26.

A wellhead tree, generally indicated at 28, is located at the surface 18. Because the structure and operation of wellhead trees is well understood by those of skill in the art, the details of the tree 28 will only be described briefly herein. The wellhead tree 28 includes a casing head 30 that is secured to the casing 20. A tubing hanger 32 resides atop the casing head 30. Tubing string 34 is suspended from the tubing hanger 32 down through the length of the wellbore 16 and terminates at a lower end 35 proximate the entrance to the cavern 12. A water leaching string 37, of a type known in the art, is disposed through the tubing string 34 and then into the volume of water 22 within the cavern 12. An annulus 36 is defined between the tubing string 34 and the casing 20. At the wellhead tree 28, a gas conduit 38 communicates with the annulus 36 through the casing head 30. A valve 40, of a type known in the art, is used to regulate flow of gas along the conduit 38 between the annulus 36 and distal pumps, pipes or other fluid storage or flow devices (not shown). Additionally, a fluid flow conduit 42 communicates with the flowbore 44 of the tubing string 34 through the tubing hanger 32. Valve 46 regulates fluid flow through the conduit 42.

Figure 2:
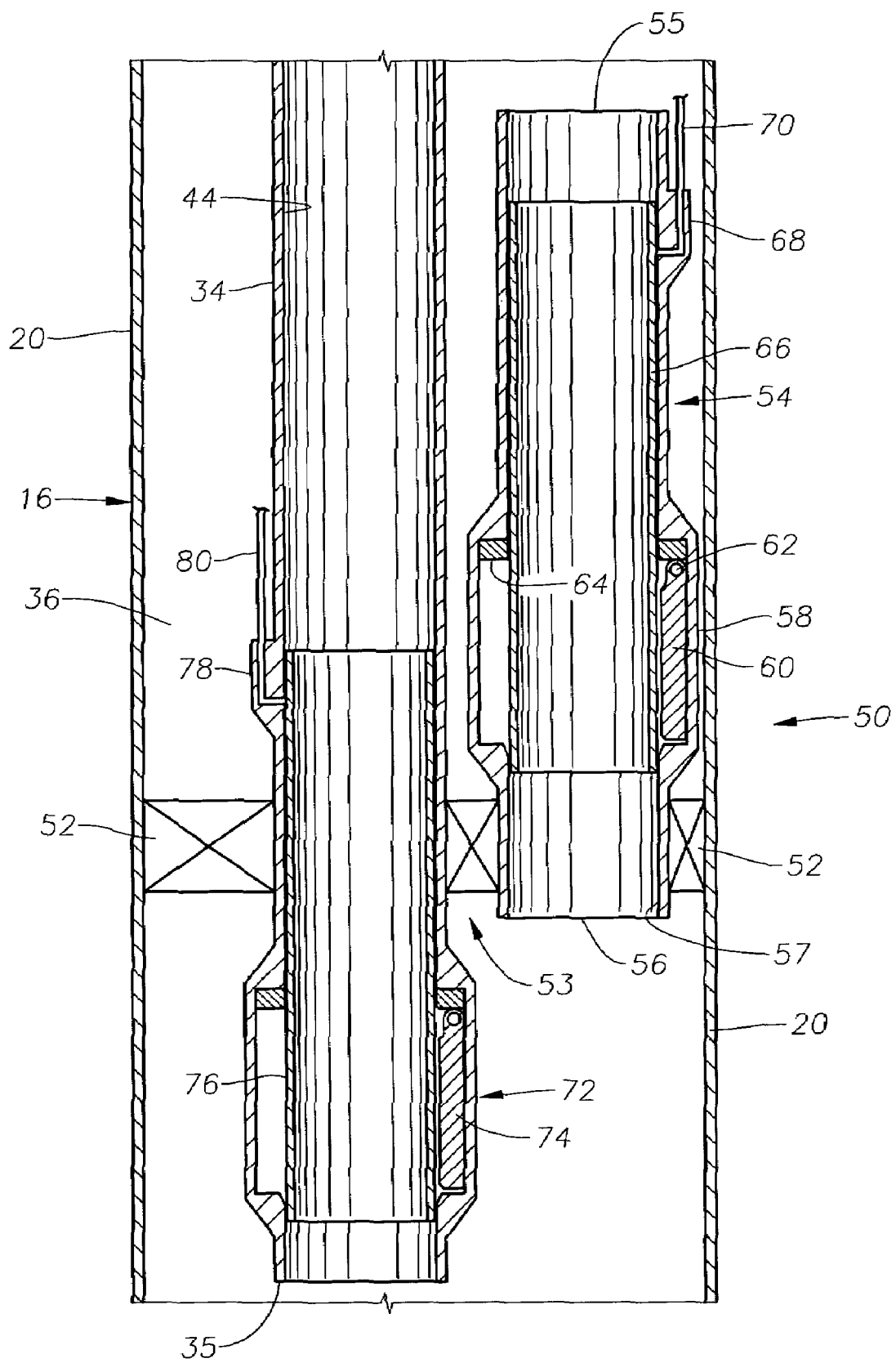
FIG. 2 illustrates details of the safety and flow control system shown in FIG. 1.

The wellbore 16 contains a safety and flow control system 50 that is depicted schematically in FIG. 1, but its components are illustrated in schematic fashion in FIG. 2. As FIG. 2 shows, the system 50 includes a packer 52. The packer 52 may be a standard, compression set packer element that establishes a fluid seal within the annulus 36 between the casing 20 and the tubing string 34. As depicted in FIG. 1, the packer 52 is preferably placed within the casing 20 proximate the opening to the cavern 12. Anchored within the packer 52 is a parallel head flow assembly, generally shown at 53, which provides two separated flow paths through the packer 52. One suitable device for use as the parallel head flow assembly 53 is the Baker Oil Tools Parallel Head (Product Family No. H70032), which is available commercially from Baker Oil Tools of Houston, Tex. This type of parallel flow device is typically used for gas lift production operations. The separation into two flow paths allows the establishment of a long string flow path (tubing string 34) and a short string flow path (pup joint 54) across the packer 52. The pup joint 54 may be affixed to the upper short string side of the parallel head flow assembly 53. In an example of sizes for the various components, the casing 20 may be a 20" casing, with the tubing string 34 being 9⅝" in diameter. In this case, the opening provided by the pup joint 54 may be 4½" around or perhaps larger. However, these sizes are not intended to be limiting, and those of skill in the art will understand that the desirable sizes will be dictated by the nature of the particular well, the flow rates that are desired, and other factors.

The pup joint 54 has an upper end 55, lower end 56 and defines an axial passageway 57 along its length. The passageway 57 contains a surface controlled, subsurface safety valve 58. In a currently preferred embodiment, depicted in FIG. 2, the safety valve 58 is a flapper type safety valve of a type known in the art and having a flapper member 60 that is secured by hinged attachment 62 within the pup joint 54. Flapper-type subsurface safety valves are described, for example, in U.S. Pat. No. 4,478,286 issued to Fineberg and U.S. Pat. No. 6,644,408 issued to Ives. Both of these patents are owned by the assignee of the present invention and both are incorporated herein by reference. During operation, the flapper member 60 of the valve 58 is angularly movable over approximately 90 degrees about the hinged attachment between an open position, shown in FIG. 2, and a closed position, wherein the flapper member 60 contacts the valve seat 64 within the pup joint 54. The flapper member 60 is biased toward the closed position by a torsion spring (not shown) that is associated with the hinged attachment, as those of skill in the art are aware. The flapper member 60 is opened and maintained in the open position by a flow tube 66 that resides radially within the pup joint 54 and is axially moveable there within. The flow tube 66 is moved axially under the impetus of a hydraulic actuator 68 of known construction. Hydraulic actuating fluid is supplied to the actuator 68 via hydraulic control lines 70, which extend upwardly to the surface 18 of the well 10. The control lines 70 are preferably encapsulated for protection due to the expected rates of fluid flow through the passageway 57.

The safety and flow control system 50 also includes a surface controlled, subsurface safety valve 72 within the flowbore 44 of the tubing string 34. The safety valve 72 is constructed and operates in the same manner as the safety valve 54 described previously. The valve 72 has a flapper element 74, actuating flow tube 76, hydraulic actuator 78, and hydraulic control lines 80.

Figure 3:
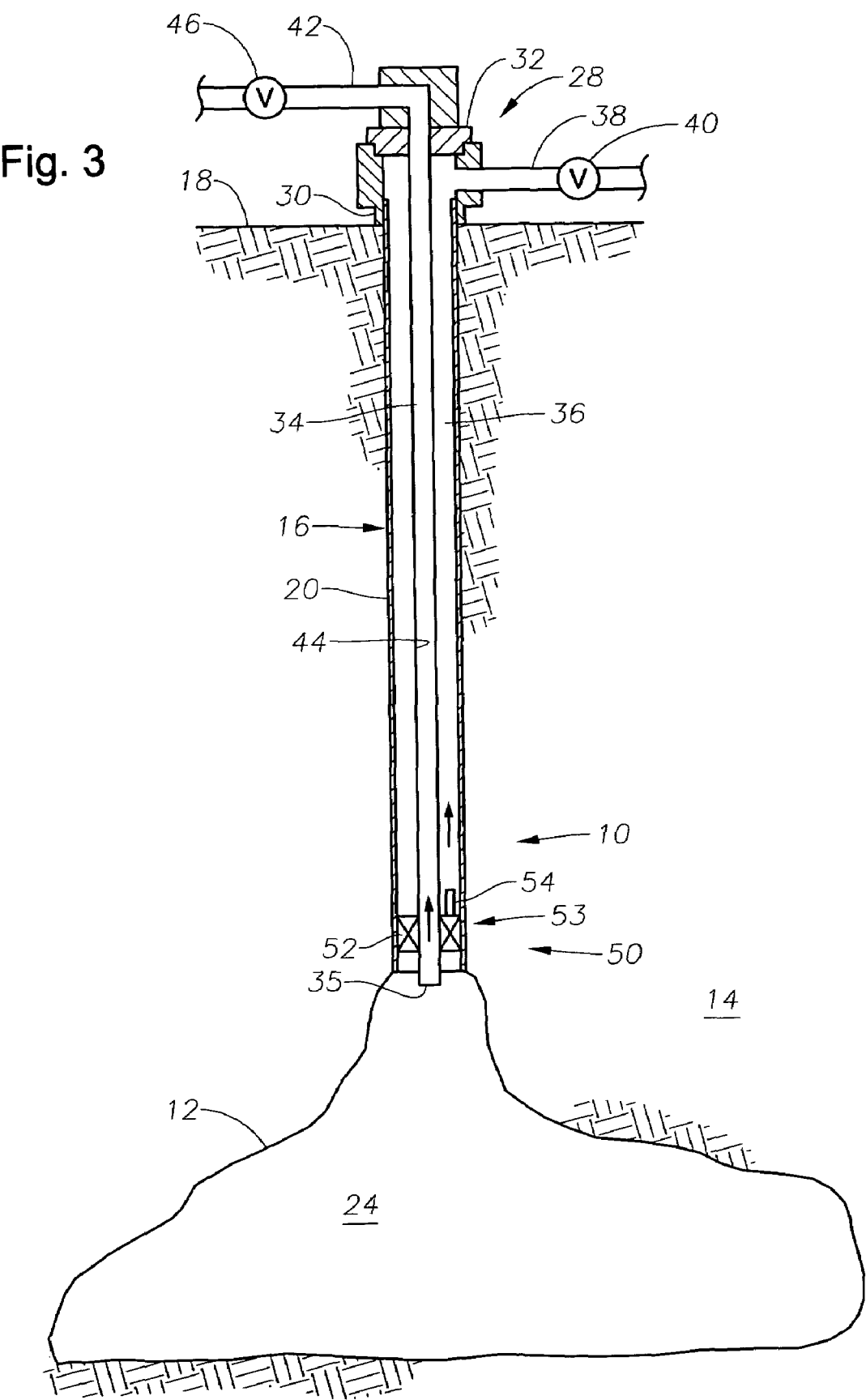
FIG. 3 illustrates the storage well and system shown in FIG. 1 now with the subsurface safety valves closed to fluid flow.
Figure 4:
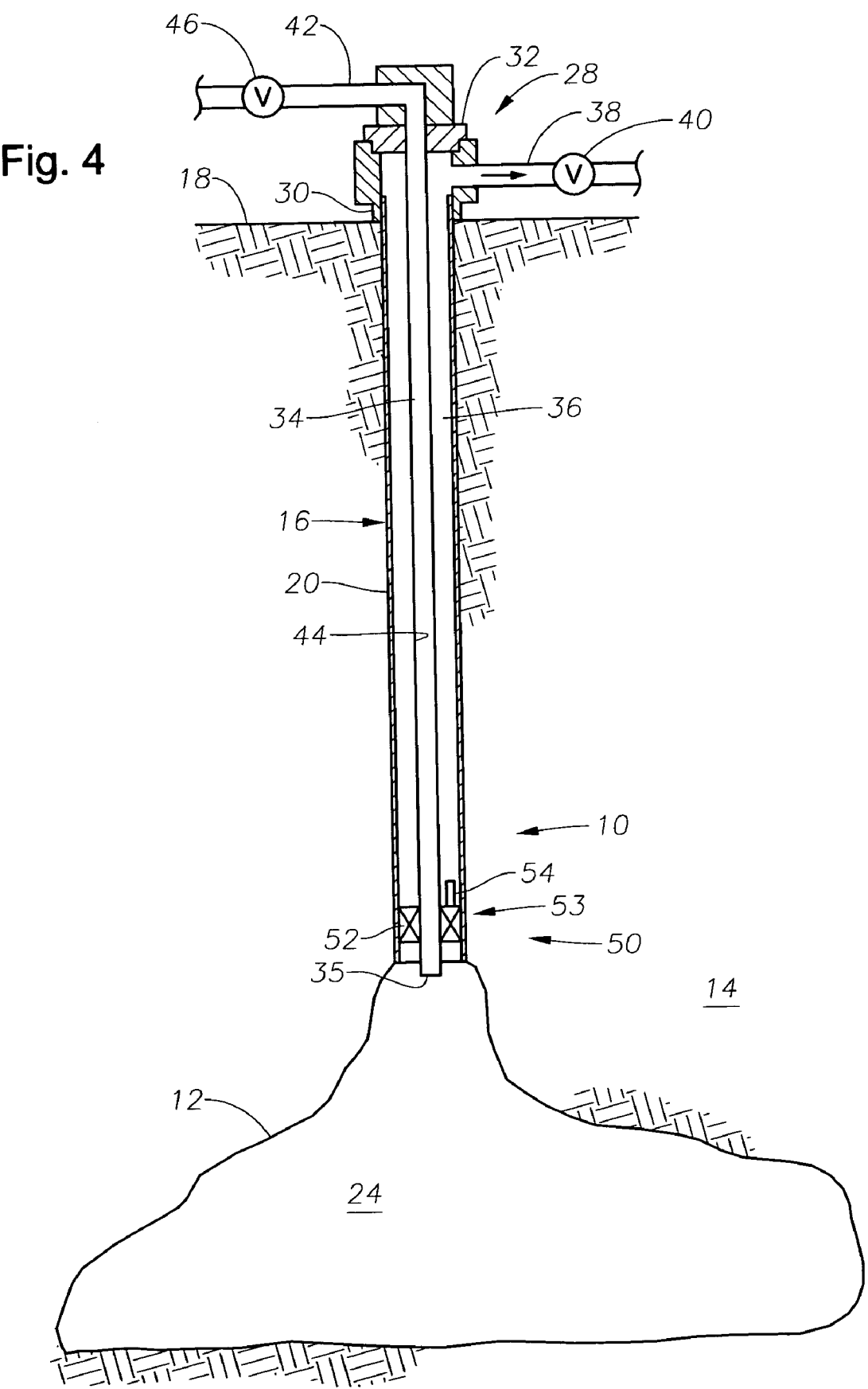
FIG. 4 illustrates the storage well and system shown in FIGS. 1 and 3 now with the subsurface safety valves open for full production from the well.

Operation of a typical gas storage well 10 is depicted in FIGS. 1, 3, and 4. In FIG. 1, gas 24 is being injected into the cavern 12 for storage. Gas is flowed, under impetus of surface-based pumping equipment (not shown) known in the art, through valve 40 and conduit 38 into annulus 36. The injected gas enters the upper portion of the cavern 12 and in doing so, seeks to displace the water 22 within the cavern 12. At the same time, water 22 is being removed from the cavern 12 through the leaching string 37. The water is removed under impetus of surface-based pumping equipment (not shown) that draws the water 22 up the flowbore 34 and through the conduit 42 and valve 46. The water 22 is then collected and disposed of in a manner known in the art. During these operations, both subsurface safety valves 58 and 72 remain open to permit fluid flow through the pup joint 54 and flowbore 34, respectively. Upon completion of water leaching, the leaching string 37 is withdrawn from the tubing string 34.

When the water 22 has been substantially leached from the cavern 12, and the desired amount of injected gas 24 stored therein, both valves 58 and 72 may be closed off, as illustrated in FIG. 3, to retain the gas 24 within the cavern 12. It is noted that this configuration, both valves 58, 72 being closed, may be used when it is desired to completely close off flow through the flowbore 44 and the annulus 36 during any phase of operation of the gas well 10. The valves 58, 72 are actuated between their open and closed positions by application of hydraulic actuating fluid through control lines 70 and 80, in a manner known in the art.

FIG. 4 depicts the storage well 10 now with gas 24 being produced from the cavern 12. In FIG. 4, previously injected gas 24 is being flowed upwardly through both the annulus 36 and through the flowbore 44 of the tubing string 34. The produced gas flows out of the wellbore 16 through both conduits 38 and 42 to surface-based storage or processing facilities (not shown), or to pipelines (not shown) for transport to distal locations. It will be appreciates that high production flow rates can be achieved through the wellbore 16. The entire cross-section of the flowbore 44 and essentially the entire annular area of the annulus 36, restricted only by passage through the pup joint 54, is available for gas production. Additionally, gas 24 could also be produced only through the annulus 36, if desired, for lower flow rates by closing off the valve 72 within the flowbore 44. Alternatively, gas 24 could be produced only through the flowbore 44, for lower flow rates, by closing off the valve 58. Each of the subsurface valves 58, 72 is operable independently of the other.

The safety and flow control system 50 of the present invention provides significant advantages over prior art flow control and safety systems. First, complete control is provided over the flow of fluids into and out of the well 10. The valves 52, 72 of the system 50 can supplement or even replace valves 40, 46 used at the wellhead tree 28. Because the safety valves 58, 72 are located within the wellbore 16 and are operable from the surface 18, the safety and flow control system 50 can be used to shut off all flow to or from the well 10 quickly in the event of an emergency. Further, the system 50 may be readily constructed using a conventional off-the-shelf packer and safety valves. It is, therefore, much less expensive and available than alternative solutions for storage well flow control and/or safety.

The packer 52 and valves 58, 72 are run into the wellbore 16 along with the tubing string 34 prior to operation and do not require downhole intervention for operation thereafter. The packer 52 is set using standard setting techniques.

Those of skill in the art will recognize that numerous modifications and changes may be made to the exemplary designs and embodiments described herein and that the invention is limited only by the claims that follow and any equivalents thereof.

What is claimed is:

1. A safety and flow control system within a gas storage well having a subsurface gas storage cavern, a wellbore communicating the cavern with a surface-based wellhead, and a tubing string extending from the wellhead to the cavern to form an annulus between the tubing string and a wall of the wellbore, the system comprising:
    a first flapper-type safety valve disposed within a flowbore of the tubing string, the first valve being operable between an open position, wherein fluid flow is permitted through the flowbore from the gas storage cavern, and a closed position, wherein fluid flow is blocked through the flowbore; and
    a second flapper-type safety valve disposed within the annulus, the second valve being operable between an open position, wherein fluid flow is permitted through the annulus and into the gas storage cavern for storage of fluid within the gas storage cavern, and a closed position, wherein fluid flow is blocked through the annulus.

2. The safety and flow control system of claim 1 wherein the second flapper-type safety valve is retained within a flow passageway of a pup joint that is disposed within the annulus.

3. The safety and flow control system of claim 2 further comprising a packer element within the annulus to form a fluid seal between the wall of the wellbore and both the tubing string and the pup joint.

4. The safety and flow control system of claim 1 further comprising at least one hydraulic control line for control of each of the first and second flapper-type safety valves, the at least one control line extending to a surface-based location for surface-based control of the safety valves.

5. The safety and flow control system of claim 1 wherein the first and second flapper-type safety valves are each actuated by an axially moveable flow tube.

6. The safety and flow control system of claim 1 wherein the first flapper-type safety valve selectively blocks flow of gas out of the storage cavern.

7. The safety and flow control system of claim 1 wherein the second flapper-type safety valve selectively blocks flow of gas out of the storage cavern.

8. An underground gas storage and production system comprising:
    an underground cavern for storage of hydrocarbon gas;
    a wellbore communicating the cavern with a surface wellhead;
    a tubing string disposed within the wellbore, the tubing string defining an interior flowbore along its length and an annulus between the tubing string and a wall of the wellbore;
    a first flapper-type valve within the flowbore operable between open and closed positions for selectively closing off fluid flow from the underground gas storage cavern through the flowbore; and
    a second flapper-type valve within the annulus operable between open and closed positions for selectively closing off fluid flow through the annulus and into the gas storage cavern for storage of fluid within the gas storage cavern.

9. The storage and production system of claim 8 further comprising a pup joint disposed within the annulus, the pup joint defining an axial flow passage, and wherein the second flapper-type valve is retained within the flow passage.

10. The storage and production system of claim 9 further comprising a packer element within the annulus forming a fluid seal between the wall of the wellbore and both the tubing string and the pup joint.

11. The storage and production system of claim 8 wherein the gas storage cavern comprises a salt dome.

12. The storage and production system of claim 8 wherein the wellbore is lined with casing.

13. A method for selectively storing hydrocarbon gas within a gas well having an underground storage cavern and a wellbore communicating the storage cavern with a surface of the well, the method comprising the steps of:
    disposing a tubing string within the wellbore and into the cavern to define an annulus between the tubing string and a wall of the wellbore, the tubing string further defining a flowbore along its length and having a first flapper-type safety valve therein;
    disposing a second flapper-type safety valve within the annulus;
    flowing gas into the cavern for storage via the annulus;
    closing the first and second safety valves during storage;
    opening at least one of the first and second safety valves; and
    flowing stored gas from the cavern via at least one of the annulus and the flowbore.

14. The method of claim 13 wherein the step of flowing gas into the cavern for storage further comprises the step of simultaneously removing water from the cavern.

15. The method of claim 14 wherein the step of leaching water from the cavern further comprises:
    disposing a leaching string through the tubing string and into the cavern; and withdrawing water from the cavern through the leaching string.

16. The method of claim 13 wherein the step of opening at least one of the first and second safety valves further comprises opening both the first and second safety valves to produce gas through both the flowbore and the annulus.

17. The method of claim 13 wherein the step of opening at least one of the first and second safety valves further comprises opening the first valve to allow production of gas through the flowbore.

18. The method of claim 13 wherein the step of opening at least one of the first and second safety valves further comprises opening the second valve to allow production of gas through the annulus.

19. The method of claim 13 further comprising the step of closing both safety valves.

* * * * *